US011621963B2

(12) United States Patent
Lamberts et al.

(10) Patent No.: US 11,621,963 B2
(45) Date of Patent: Apr. 4, 2023

(54) FLEET HEALTH MANAGEMENT CORRECTIVE ACTION COMMUNICATION EXCHANGE

(71) Applicant: Western Digital Technologies, Inc., San Jose, CA (US)

(72) Inventors: Bernd Lamberts, San Jose, CA (US); Jeffrey Hobbet, Holly Springs, NC (US); Evan Richardson, Rochester, MN (US); Remmelt Pit, Menlo Park, CA (US); Ravi Singh, San Jose, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 35 days.

(21) Appl. No.: 17/333,007

(22) Filed: May 27, 2021

(65) Prior Publication Data
US 2022/0385672 A1    Dec. 1, 2022

(51) Int. Cl.
*H04L 9/40* (2022.01)
*G06F 16/27* (2019.01)
*G06N 7/00* (2023.01)

(52) U.S. Cl.
CPC ............ *H04L 63/126* (2013.01); *G06F 16/27* (2019.01); *H04L 63/0428* (2013.01); *G06N 7/005* (2013.01)

(58) Field of Classification Search
CPC ... H04L 63/126; H04L 63/0428; G06F 16/27; G06N 7/00

(Continued)

(56) References Cited

U.S. PATENT DOCUMENTS 7,805,443 B2 * 9/2010 Konig .................. G06F 16/217
707/736
8,554,779 B1 * 10/2013 Batali ................. G06F 21/6254
707/780

(Continued)

FOREIGN PATENT DOCUMENTS

WO    2015022696 A1    2/2015

OTHER PUBLICATIONS

International Search Report and Written Opinion for counterpart PCT/US2022/013359, dated May 23, 2022, 8 pages, ILPO ISA/IL.

(Continued)

*Primary Examiner* — Amare F Tabor
(74) *Attorney, Agent, or Firm* — John D. Henkhaus

(57) ABSTRACT

An approach to exchanging information between data storage devices (DSDs) within a secure data center and an external fleet health manager (FHM) application includes querying one or more DSDs for data to be analyzed, including providing a unique query identifier, whereby a particular DSD responsively provides (i) a device identifier identifying itself, (ii) a random key code for authentication and integrity purposes, (iii) the data to be analyzed, and (iv) the query identifier for the FHM application to verify. The FHM application can then digitally sign a corrective action payload, using the key code from the particular DSD, including the query identifier and the device identifier and a recommended corrective action, and transmit the signed corrective action payload to the data center for application to the particular DSD, whereby the DSD can execute predefined fundamental repair action operation(s) corresponding to the corrective action for in-situ repair.

20 Claims, 7 Drawing Sheets

(58) Field of Classification Search
USPC .......................................................... 713/168
See application file for complete search history.

(56) References Cited

U.S. PATENT DOCUMENTS

| | | | |
|---|---|---|---|
| 9,003,239 B2 | 4/2015 | Bradley et al. | |
| 9,135,460 B2 | 9/2015 | Birch et al. | |
| 9,436,773 B2* | 9/2016 | Milstead | H04L 61/00 |
| 9,659,105 B2* | 5/2017 | Topchy | G06F 16/957 |
| 9,760,420 B1 | 9/2017 | Letz et al. | |
| 10,691,528 B1 | 6/2020 | Ferreira et al. | |
| 10,778,427 B2* | 9/2020 | Wang | G06Q 30/0623 |
| 2004/0025018 A1* | 2/2004 | Haas | H04W 12/106 |
| | | | 713/168 |
| 2010/0269174 A1* | 10/2010 | Shelest | H04L 9/3236 |
| | | | 707/E17.014 |
| 2010/0293378 A1* | 11/2010 | Xiao | H04L 9/3268 |
| | | | 713/168 |
| 2011/0060945 A1 | 3/2011 | Leprince et al. | |
| 2012/0324240 A1* | 12/2012 | Hattori | G06F 21/6227 |
| | | | 713/189 |
| 2013/0021261 A1* | 1/2013 | Wilson | G09G 5/003 |
| | | | 345/1.3 |
| 2013/0212431 A1 | 8/2013 | Ong | |
| 2020/0344265 A1 | 10/2020 | Kelly | |

OTHER PUBLICATIONS

Fleets International Enterprises, Fleet Management Software, 1 page, downloaded from https://www.fleetsenterprises.com/products/fleet-management-software.html as early as Jan. 29, 2020.
Microsoft Azure, Azure Stack Hub fleet management preview, May 19, 2020, 1 page, downloaded from https://azure.microsoft.com/en-in/updates/azure-stack-hub-fleet-management-preview/.
Microsoft Azure, Hypervisor security on the Azure fleet, Nov. 10, 2020, 2 pages, downloaded from https://docs.microsoft.com/en-us/azure/security/fundamentals/hypervisor.
Hou, Hanxu et al., Rack-Aware Regenerating Codes for Data Centers, IEEE Transactions On Information Theory, vol. 65, No. 8, Aug. 2019, pp. 4730-4745.

* cited by examiner

FLEET HEALTH MANAGEMENT CORRECTIVE ACTION COMMUNICATION EXCHANGE

FIELD OF EMBODIMENTS

Embodiments of the invention may relate generally to data centers, and particularly to approaches to exchanging data between a fleet health manager and a secure data center.

BACKGROUND

As networked computing systems grow in numbers and capability, there is a need for more storage system capacity. Cloud computing and large-scale data processing further increase the need for digital data storage systems that are capable of transferring and holding significant amounts of data. One approach to providing sufficient data storage in data centers is the use of arrays of data storage devices. Many data storage devices can be housed in an electronics enclosure (sometimes referred to as a "rack"), which is typically a modular unit that can hold and operate independent data storage devices in an array, computer processors, routers and other electronic equipment. Data centers typically include many rack-mountable data storage devices that are used to store the large amounts of data, often referred to as a "fleet".

Increasingly, data center operators are in need of assistance with operating their fleet of storage devices. One of the most common challenges associated with operating a data center is the assessment and management of exception events within the data center. Furthermore, data centers have very restrictive security policies to protect the hosted data. For this reason, data center operators typically do not allow any third-party software to reside or run within the secure zone.

Any approaches that may be described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to exchanging information and data between a fleet health manager and a secure data center are described. In the following description, for the purposes of explanation, numerous specific details are set forth to provide a thorough understanding of the embodiments of the invention described herein. It will be apparent, however, that the embodiments of the invention described herein may be practiced without these specific details. In other instances, well-known structures and devices are shown in block diagram form to avoid unnecessarily obscuring the embodiments of the invention described herein.

Physical Description of an Illustrative Operating Context-Data

Systems and Data Centers

Figure 2:
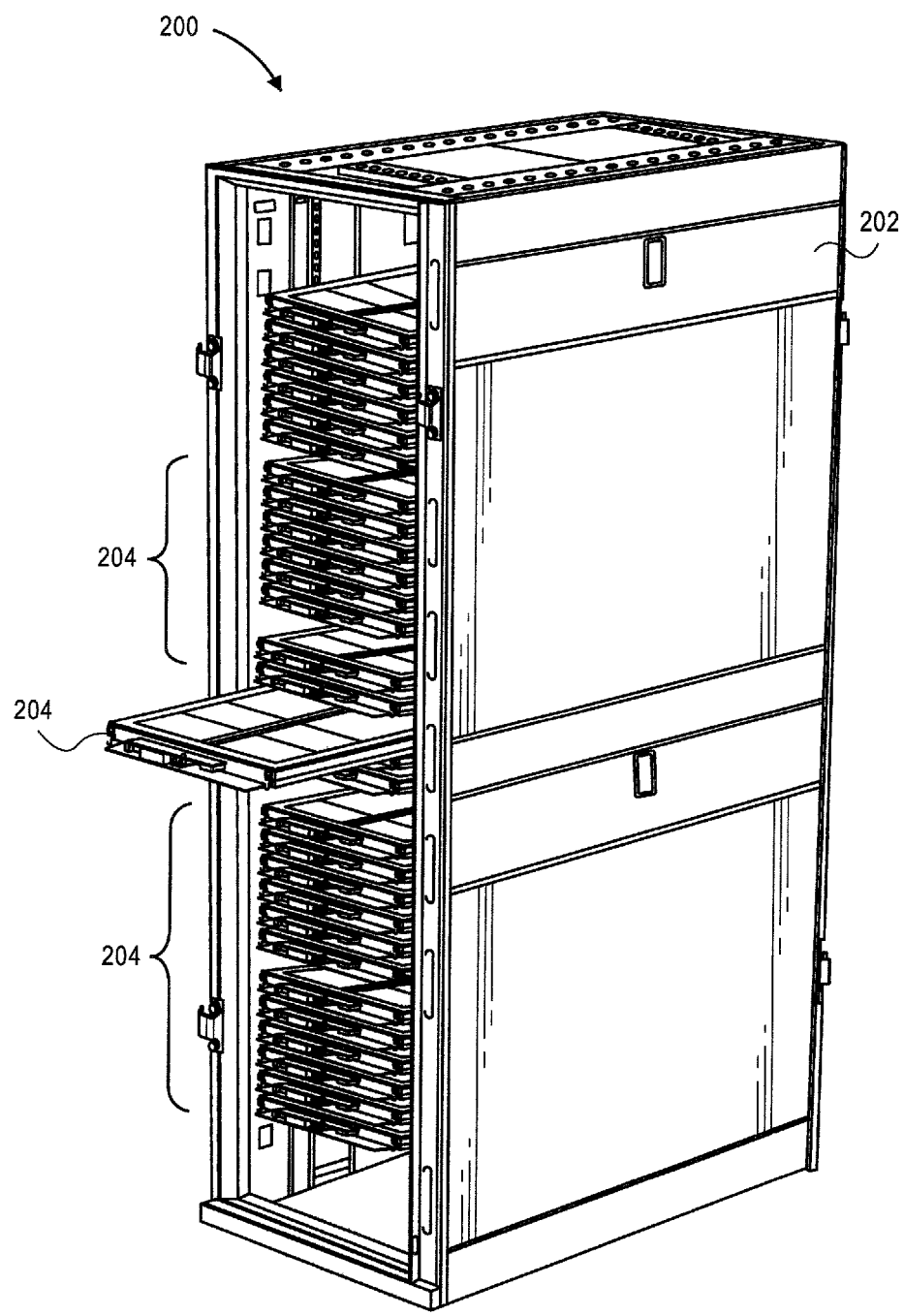
FIG. 2 is a perspective view illustrating a data storage system, according to an embodiment.

There is a commercial demand for high-capacity digital data storage systems, in which multiple data storage devices (DSDs), such as hard disk drives (HDDs) and/or solid-state drives (SSDs), tape drives, hybrid drives, and the like are housed in a common enclosure. Data storage systems often include large enclosures that house multiple shelves on which rows of DSDs are mounted. FIG. 2 is a perspective view illustrating an example data storage system, according to embodiments. A data storage system 200 may comprise a system enclosure 202 (or "rack 202"), in which multiple data storage system trays 204 are housed. Each tray 204 may be placed or slid into a corresponding slot within the rack 202, for example. Rack 202 further houses a system controller, and may further house switches, storage server(s), application server(s), a power supply, cooling fans, etc.

A data storage system is typically communicatively coupled with a host, which may be embodied in a hardware machine on which executable code executes (for non-limiting examples, a computer or hardware server, and the like), or as software instructions executable by one or more processors (for non-limiting examples, a software server such as a database server, application server, media server, and the like). A host generally represents a client of the data storage system and, therefore, has the capability to make read and write requests (input/output or "I/O") to the data storage system. Note that controllers at various levels of a storage system architecture may also be referred to as a "host" because the term is often generally used in reference to any device that makes I/O calls to a DSD or an array of devices.

Generally, a data center may be likened to an extreme version of a data storage system (or multiple data storage systems working together), along with the power, cooling, space, and the like needed to operate the storage, management, and sharing of data as well as the corresponding network infrastructure (e.g., routers, switches, firewalls, application-delivery controllers, and the like). Expanding on that notion, a "hyperscale" data center generally refers to a facility providing robust, scalable applications and storage services to individuals or other businesses. Exemplary implementations of hyperscale computing include cloud and big data storage, web service and social media platforms, enterprise data centers, and the like, which may consist of thousands of servers linked by an ultra-high speed fiber network. Because businesses depend on the reliability and constant functionality of all sizes and forms of data centers, the security and reliability of a data center are paramount concerns.

An example data storage system may comprise multiple DSDs such as HDDs and/or SSDs, each communicative with and under the control of a system controller via a communication interface according to a corresponding communication protocol. Each DSD would include corresponding non-volatile memory (NVM) (e.g., typically in the form of spinning magnetic disk media in the case of HDDs) controlled by a respective device controller, which typically includes a log module. Each log module is capable of logging actions taken by the device controller, such as logging of read, write, and seek errors, associated recovery actions, and other near-term and long-term DSD status information, where all may be referred to as "exception events". A log module may be, for example, constituent to a corresponding system on chip (SoC), such as part of the data channel circuitry or the hard disk controller circuitry, in the context of an HDD.

Introduction

Terminology

References herein to "an embodiment", "one embodiment", and the like, are intended to mean that the particular feature, structure, or characteristic being described is included in at least one embodiment of the invention. However, instances of such phrases do not necessarily all refer to the same embodiment, If used herein, the term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees throughout.

While terms such as "optimal", "optimize", "minimal", "minimize", "maximal", "maximize", and the like may not have certain values associated therewith, if such terms are used herein the intent is that one of ordinary skill in the art would understand such terms to include affecting a value, parameter, metric, and the like in a beneficial direction consistent with the totality of this disclosure. For example, describing a value of something as "minimal" does not require that the value actually be equal to some theoretical minimum (e.g., zero), but should be understood in a practical sense in that a corresponding goal would be to move the value in a beneficial direction toward a theoretical minimum.

Context

Some data storage systems implement diagnostic and in-situ (e.g., "in place" or "in position") repair procedures. This means that system hard disk drives (HDDs) that have failed during operation in the field are diagnosed and fixed in the field to the extent possible, and if they cannot be fixed, then they are retired in place rather than replaced. Preferably, in-situ repairs entail automated or semi-automated procedures, while the HDD of interest remains in the system enclosure. Many HDD repairs do not result in any loss of capacity or performance. An HDD may be repaired in a way that still enables continued use by system software, albeit with reduced capacity or performance. An HDD that cannot be repaired may be allowed to fail in place within the system, such as in scenarios in which the system was shipped with over-provisioned storage capacity that permits availability of the full, specified storage capacity despite a number of drive failures. In-situ repair can eliminate the cost of scheduling service technicians to replace drives that fail in the field, as well as the cost of those replacement drives. Additionally, in-situ repair can reduce the AFR (annual failure rate) of storage devices, and will likely eliminate the ARR (annual return rate) as future product releases adopt a "fail-in-place" model. Analysis of failed drives shows that many HDDs that fail in the field can be restored to full or partial usage with relatively uncomplicated techniques.

Recall that data centers have very restrictive security policies in order to protect the hosted data, and that data center operators typically do not allow third-party software to reside or run within the secure zone. Hence, a key challenge with a secure data center and an associated fleet health manager application is how to solve the contradicting requirements of data center access and availability of communication between the external fleet health manager and the data storage devices (DSDs) within the data center, and security encapsulation on the other side. A typical approach to this challenge is to locate fleet health management software on the storage server in the data center, however, this significantly limits the scope of the software solutions. That is, not only are deployment of fleet health management tools within a data center very limited due to these restrictive security policies regarding outside (e.g., third party) software code, but even if such tools are deployed directly in a data center, challenges would remain with respect to software maintenance (e.g., deploying updates fleet-wide) and the ability of any given host node to benefit from the insights derived from all the other nodes would be significantly limited. In view of the foregoing, a need to establish a communication interface between an external analytics health manager and DSDs within the data center manifests.

Fleet Health Manager Communication of In-Situ Corrective Actions to within a Data Center Processing, functions, procedures, actions, method steps, and the like, that are described herein may include enactment by execution of one or more sequences of one or more instructions stored in one or more memory units and which, when executed by one or more processors, cause such performance. Referenced controllers may be embodied in any form of and/or combination of software, hardware, and firmware, such as an application-specific integrated circuit (ASIC) comprising at least one memory unit for storing such instructions and at least one processor for executing such instructions.

Figure 3:
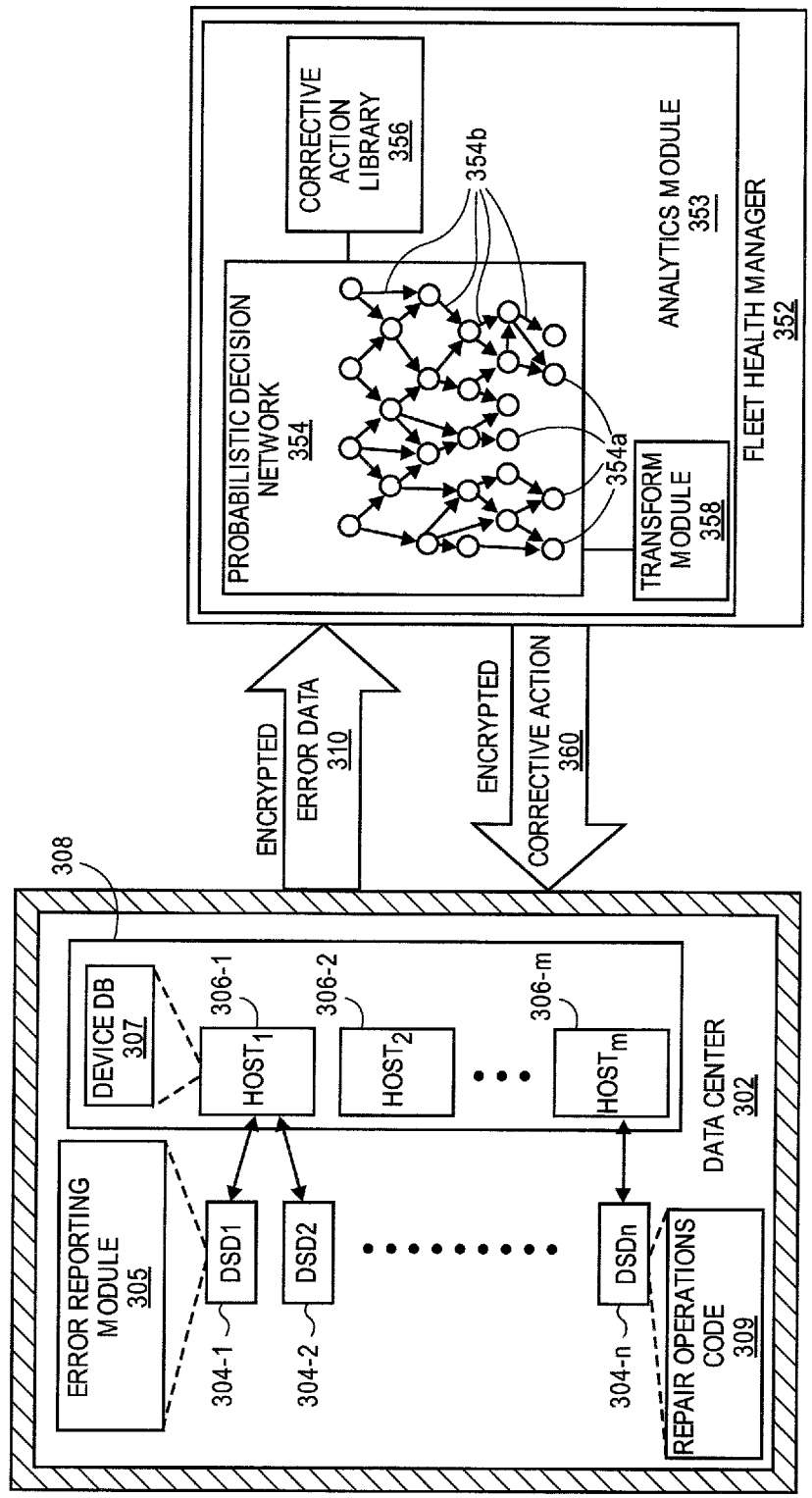
FIG. 3 is a block diagram illustrating a context in which a data storage device fleet health management application may be implemented, according to an embodiment.

FIG. 3 is a block diagram illustrating a context in which a data storage device fleet health management application may be implemented. FIG. 3 graphically depicts a data center 302 communicatively coupled with a fleet health manager 352 (or simply "FHM 352"). Data center 302 comprises multiple data storage devices (DSDs) 304-1, 304-2 through 304-n (collectively, "DSDs 304"; generally and singularly, "DSD 304"), where n represents an arbitrary number of HDDs and/or SSDs that may vary from implementation to implementation but is essentially limitless. Each of these DSDs 304 is communicatively coupled with and under some control of one or more hosts 306-1, 306-2 through 306-m (collectively, "hosts 306"; generally and singularly, "host 306"), where m represents an arbitrary number of hosts that may vary from implementation to implementation. One non-limiting example of a type of host is an application server. Typically, a single host such as 306-1 is configured to control multiple DSDs 304, so the number of DSDs 304 would outnumber the number of hosts 306.

Many of the challenges associated with communicating with a DSD within a secure data center originate from the security requirements of a modern data center, by which no large scale hyperscale provider can afford to run third-party code in their data center, as even a single security incident could jeopardize their entire business model. Thus, the use of binary data (e.g., binary files) and code (e.g., binaries) within the data center and the movement of binary data and code across the security barriers of the data center is typically prohibited. Therefore, one of the challenges is how to perform analytics outside of a fleet of DSDs and provide the results back to the DSDs. Furthermore, in this setting it is crucial that a particular DSD only uses the correct remedies corresponding to the data which were originally extracted from that particular DSD. Hence, assurance is needed that only authenticated and correct repair actions are executed by a DSD within a data center.

According to embodiments, generally, security and flexibility are provided by a unique virtualization approach whereby, firstly, only the open-source code log extraction and/or decoder software requires device access. This software can be executed by the one or more hosts 306 or by a data center storage server, for example, running within a customer application area 308 of the data center 302. Thus, this code is executed under the control of the data center operator rather than an external third party, and extracts the error log data (e.g., from error reporting module 305) which provides an abstraction or representation of the DSD 304, and this "image" of the DSD 304 can be routed through the data center 302 in a secure manner. Secondly, a database application layer is utilized to provide easy integration by separating this database layer, depicted as device database ("DB") 307, as an open data schema application whose architecture and layout are considered compliant with all major cloud data providers. Thirdly, a fleet health manager 352 application can operate anywhere in a non-secure customer zone, depicted as customer application area 308 of the data center 302, which can access the DSD abstraction via the device DB 307.

Device Error Reporting

Each of the DSDs 304 is configured with error reporting module 305 functionality which is capable of logging actions taken by the device controller, such as logging of read, write, and seek errors, associated recovery actions, and other near-term and long-term DSD status information. As such, each of the DSDs 304 can report out internal error data such as via standard logs such as Key Code Qualifiers (KCQs) and SMART (Self-Monitoring, Analysis, and Reporting Technology) state metrics, as well as via more complex vendor-unique representations of the device, which may include time series data or complex key value pair data sets of arbitrary complexity, for non-limiting examples. Such logs typically report out error data that characterizes excursions from "normal" operational behavior of each corresponding DSD 304, as well as data about error-free DSD operational behavior, utilization, and other status information (generally, "use data") which can be used for data center optimization. Such data is typically reported out by each of the DSDs 304 to its corresponding host 306, where it may be translated and/or transformed into a different format. For example, in view of the strict security protocols typically associated with a data center such as data center 302, the hosts 306 may transform binary error data from a DSD 304 into a human-readable, non-executable, secure format before transmission outside of the data center 302. The error data from each error reporting module 305 of DSD 304 is represented in some form and transmitted out of the data center 302 in the form depicted as error data 310.

According to an embodiment, the data depicted as error data 310 that is ultimately communicated from the data center 302 to the FHM 352 is represented in device database 307 as key-value pair ("KVP") data structures in human-readable format, i.e., a non-executable format, which avoids the security constraint issues with binary files and binaries referred to elsewhere herein. One aspect of this architecture is that components of the fleet health management system described and illustrated herein can be partitioned according to various data center flow scalability and security needs, and another aspect is that the means are provided to extract and decode the error logs from error reporting module 305 at a data center server, such as at one or more hosts 306. Thus, a data center provider is enabled to move these DSD 304 representations to its own cloud applications where they use the data schema provided to aggregate the data, such as at device database 307.

Fleet Health Manager

Fleet health manager 352 comprises a probabilistic decision network 354 (or simply "decision network 354") and a corrective action library 356, depicted as residing within an analytics module 353. The decision network 354 is designed, configured, programmed to characterize (i) a set of operational metrics (depicted as nodes 354a of decision network 354, also referred to as "operational metrics 354a") and (ii) certain DSD 304 controller rules (depicted as connecting lines 354b of decision network 354b, also referred to as "controller rules 354b") which represent internal controls of DSD 304 and corresponding conditional relationships among the operational metrics. According to an embodiment, the DSD controller rules 354b are implemented to include, but are not limited to, mathematical expressions of the internal algorithms used to control the operational behavior of DSD 304, i.e., by the internal DSD controller by way of algorithms embodied by and embedded in controller firmware logic, data, instructions, and the like.

According to an embodiment, the operational metrics 354a and the controller rules 354b are expressed within decision network 354 as a mathematical graph, i.e., a structure according to which some pairs of a set of objects or nodes are in some way related to each other. Here, the nodes or vertices represent and characterize the operational metrics 354a and the lines or edges or links represent and characterize the controller rules 354b which embody the relationships between and among the various operational metrics 354a. These relationships include but are not limited to the known and certain behavioral dependencies between and among the various operational metrics 354a of each of the DSDs 304 as manifested in the controller rules 354b, which may be in the form of differential equations which define the relationships between physical quantities represented as functions and their rates of change as represented by their respective derivatives. According to an embodiment, decision network 354 is considered and/or based on a Bayesian network, system, model, which is a probabilistic graphical model (e.g., a directed acyclic graph, or "DAG") that represents a set of variables and their conditional dependencies. As such, with reference to the concept of machine learning or predictive analytics, the controller rules 354b of decision network 354 may be "trained" with a training set(s) of data to make predictions or decisions without being specifically or explicitly programmed to do so. Hence, from the decision network 354 the likelihood or relative probability that one or more possible causes was a contributing factor to the particular excursion is determinable. For example, determining the likelihood that a possible cause was a contributing factor to the particular excursion includes traversing the probabilistic graphical model backwards from the node that corresponds to the operational metric 354a that corresponds to the particular excursion associated with and reported out from the particular DSD 304. Then, according to or based on the determined possible cause(s), a corresponding corrective action may be determined and selected from the corrective action library 356 for sharing with the particular DSD 304, such as via a corresponding host 306, to provide the DSD 304 with real actionable information to guide the DSD 304 in executing an in-situ repair to self-fix in the field to the extent possible.

One approach to the assessment and management of exception events within a fleet of data storage devices is described and illustrated in U.S. patent application Ser. No. 17/332,552, entitled "FLEET HEALTH MANAGEMENT DEVICE CLASSIFICATION FRAMEWORK" and filed on the same date herewith, the entire content of which is incorporated by reference in its entirety for all purposes as if fully set forth herein.

Actionable Advice

With fleet health manager 352, the output to the data center 302 (depicted as corrective action 360) is expressed differently than with the typical health management applications. Here, the conclusions or decisions that are reached from exercising the decision network 354 are effectively translated into actionable advice or actionable items, selected from the corrective action library 356 based at least in part on the conclusion reached, and known and recognizable in one form or another by each DSD 304 and/or each host 306 (or each data center controller if applicable). Hence, the DSD 304 can identify the corrective action from the command it receives from its host 306, match the corrective action with executable code stored within the DSD 304, such as repair operations code 309, and execute that code embodying an in-situ repair to the DSD 304.

In determining a suitable corrective action corresponding to the conclusion reached, the fleet health manager 352 (e.g., via the decision network 354) is capable of bucketizing or characterizing excursions that it receives as represented by the error data 310 from the data center 302. For non-limiting examples, excursions may be characterized by an association with a corresponding general corrective action 360, for example, to ignore the excursion by doing nothing, to perform further data analysis on the DSD 304, to quarantine or fail the DSD 304 as the data stored thereon is no longer reliable, and the like. Furthermore, excursions may be characterized by an association with a more specific in-situ corrective action 360, for non-limiting examples, fleet health manager 352 may recommend a "head depop" (head depopulation) be performed on a particular read-write head, whereby the head is classified (e.g., to the host 306 and/or to the DSD 304 controller) as ineligible for use in further I/O operations, effectively disabled from further use/operation. Alternatively, an otherwise troublesome HDD may be reformatted to its current capacity. For example, in a scenario in which one or more heads have already been depopped in a prior repair operation and the decision was made not to depop another head at this time, then the HDD may be reformatted to its current capacity, taking into account the reduced capacity corresponding to the heads that were previously depopped. Furthermore, another repair option involves forcibly sparing out troublesome region(s) of media (e.g., marking the region(s) unavailable for further I/Os) rather than undertaking a longer and more complex reformat or depop repair. Still further, a determination may be made that particular sectors of the HDD should be replaced by redundant spare sectors, referred to as a reassign operation, wherein it is crucial to ensure that only the correct action is executed because otherwise data could be lost.

Figure 4:
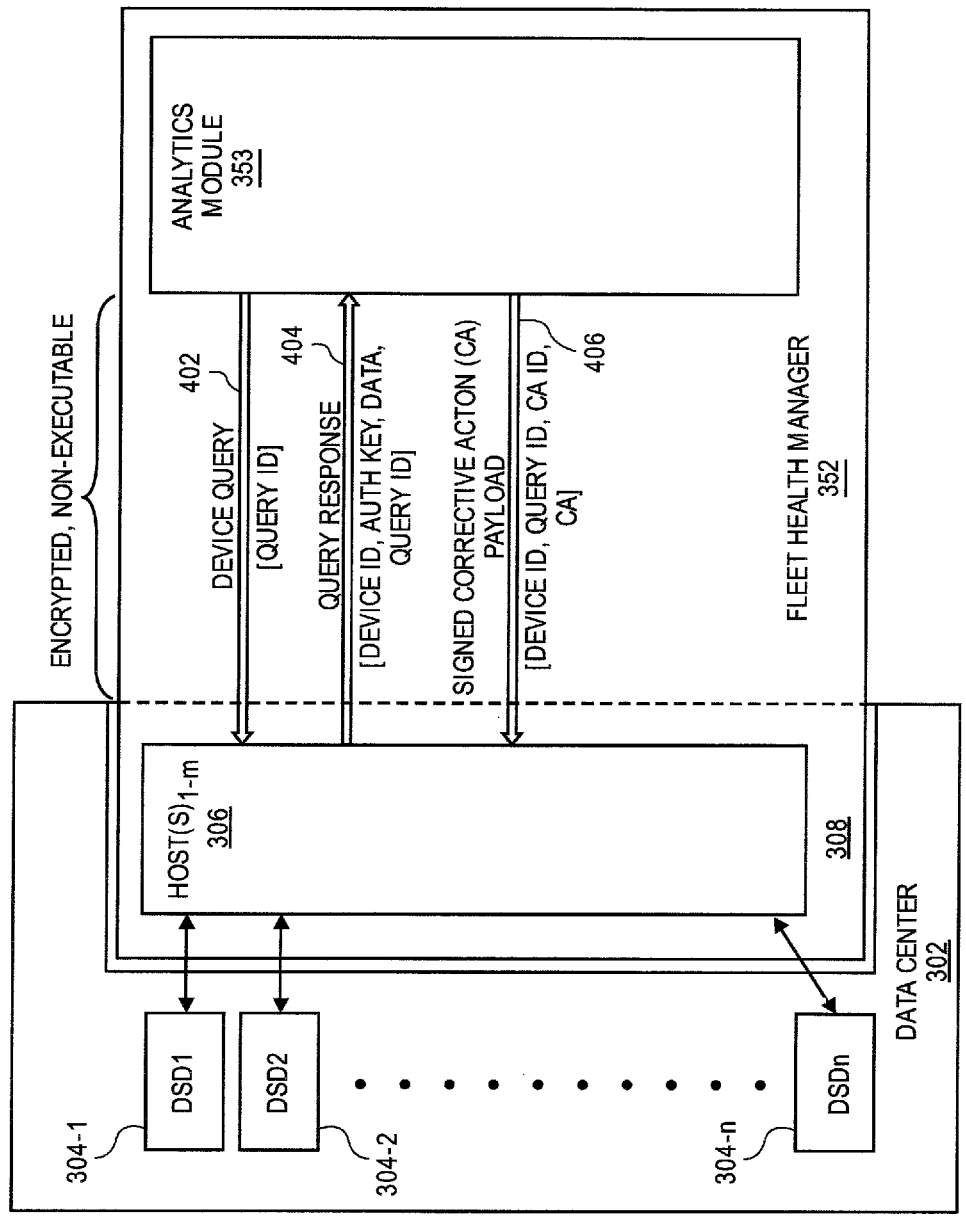
FIG. 4 is a block diagram illustrating information exchanges between an external fleet health management application and a secure data center, according to an embodiment.
Figure 5:
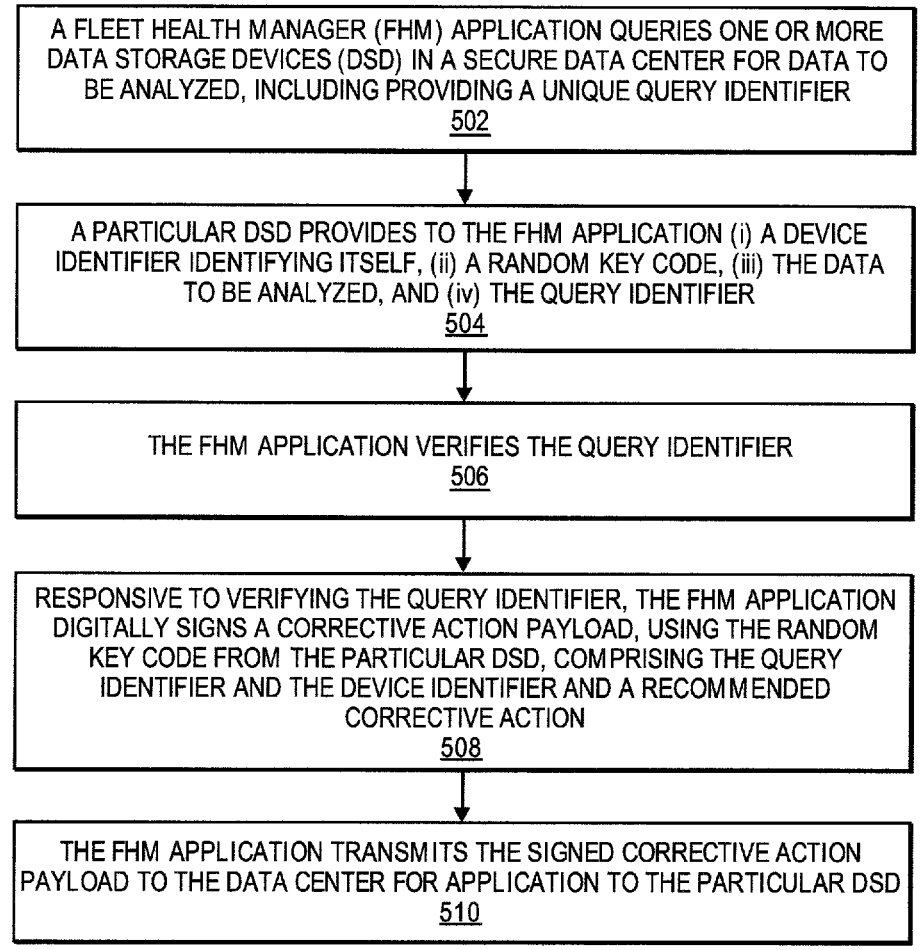
FIG. 5 is a flow diagram illustrating a method for exchanging information with a data storage device in a secure data center.

Method for Exchanging Information with a Data Storage Device in a Secure Data Center FIG. 4 is a block diagram illustrating information exchanges between an external fleet health management application and a secure data center, according to an embodiment. Some elements of FIG. 3 are repeated in FIG. 4 and, therefore, like-numbered elements of FIG. 4 operate and function similarly to the same like-numbered elements illustrated and described in reference to FIG. 3. Therefore, such element descriptions are not repeated here and reference is made to the description associated with FIG. 3. FIG. 5 is a flow diagram illustrating a method for exchanging information with a data storage device in a secure data center. The computing process or procedure of FIG. 5 may be implemented for execution as one or more sequences of one or more instructions stored in one or more memory units and which, when executed by one or more processors, cause performance of the process, and is described here with reference to the block diagram of FIG. 4.

At block 502, a fleet health manager (FHM) application queries one or more data storage devices (DSD) in a secure data center for data to be analyzed, including providing a unique query identifier. For example, as depicted as DEVICE QUERY 402, analytics module 353 of FHM 352 (FIGS. 3-4) queries for data to be analyzed (e.g., repeatedly polls the data center 302), such as error data 310 (FIG. 3) corresponding to one or more DSDs 304 (FIGS. 3-4) in a secure data center 302 (FIGS. 3-4), where this query includes a unique query identifier ("QUERY ID") to specifically and uniquely identify this particular query. According to an embodiment, this DEVICE QUERY 402 comprises an encrypted communication, such as according to one of the known public-key cryptography protocols and/or a blockchain encryption protocol including a ledger between the analytics module 353 and the DSD 304 with appended hash keys, for non-limiting examples of suitable technologies for this purpose.

At block 504, a particular DSD provides to the FHM application: (i) a device identifier identifying itself; (ii) a random key code; (iii) the data to be analyzed; and (iv) the query identifier. For example, as depicted as QUERY RESPONSE 404, a particular DSD 304 of the one or more DSDs queried (at block 502) provides to the FHM 352 a communication including the data (i)-(iv), where the (i) device identifier ("DEVICE ID") is a unique identifier associated with and identifying this particular DSD 304, the (ii) random key code ("AUTH KEY") is used for cryptographic and/or authentication purposes, the (iii) data to be analyzed comprises the data requested by the FHM 352 in DEVICE QUERY 402 (at block 502), and the (iv) query identifier is the identifier that specifically and uniquely identifies this particular query that was communicated by the FHM 352 in DEVICE QUERY 402. According to an embodiment, this QUERY RESPONSE 404 comprises an encrypted communication, such as according to the OTP encryption technique.

The (i) device identifier is subsequently used to identify and authenticate the source of communications from, and the destination of the communications to, this particular DSD 304. According to an embodiment, the (ii) random key code is likened to a PGP (Pretty Good Privacy) key used for key cryptography (e.g., symmetric key and/or public-key), which is used to facilitate an encryption program that provides the cryptographic privacy and authentication for data communications between this particular DSD 304 and the FHM 352. The (iii) data to be analyzed is just that, in a human-readable non-executable form for transmission across the data center 302 security boundary. The (iv) query identifier is as explained, and is used to continue to identify and associate this string of communication exchanges between the particular DSD 304 and the FHM 352 with this particular query from the FHM 352 as represented in the DEVICE QUERY 402.

According to an embodiment, the exchange at block 504 comprises providing the data to be analyzed to a host 306 (FIGS. 3-4) running in a customer application area 308 (FIGS. 3-4) of the data center 302. Continuing, prior to providing the QUERY RESPONSE 404 to the FHM 352, the host 306 transforms the data to be analyzed from its original source form from this particular DSD 304 to a key-value pair (KVP) form stored in the device database 307 (FIG. 3) within the data center 302, and extracts the transformed data to be analyzed from the device database 307 in response to the query of DEVICE QUERY 402, for the ultimate exchange with the FHM 352 within the QUERY RESPONSE 404.

Alternatively and according to an embodiment, the exchange at block 504 comprises providing access to the data to be analyzed to a host 306 (FIGS. 3-4) running in a customer application area 308 (FIGS. 3-4) of the data center 302, for ultimately providing to the FHM 352. Continuing, prior to providing the QUERY RESPONSE 404 to the FHM 352, the particular DSD 304 transforms the data to be analyzed from its original form to a KVP form and stores the transformed data in the device database 307 (FIG. 3) within the data center 302 and, subsequently, the host 306 extracts the transformed data to be analyzed from the device database 307 in response to the query of DEVICE QUERY 402, for the ultimate exchange with the FHM 352 within the QUERY RESPONSE 404.

At block 506, the FHM application verifies the query identifier. For example, FHM 352 verifies that the query identifier from QUERY RESPONSE 404 is consistent with that from the DEVICE QUERY 402. At block 508, in response to verifying the query identifier, the FHM application digitally signs a corrective action payload using the random key code from the particular DSD, where the corrective action payload comprises (a) the query identifier, (b) the device identifier, and (c) a recommended corrective action. For example, once the FHM 352 verifies that the query identifier from QUERY RESPONSE 404 is consistent with that from the DEVICE QUERY 402 (block 506), the FHM 352 digitally signs a corrective action payload using the random key code from the particular DSD (e.g., (ii) from QUERY RESPONSE 404), where the corrective action payload as depicted as SIGNED CORRECTIVE ACTION (CA) PAYLOAD 406 comprises (a) the query identifier (e.g., (iv) from QUERY RESPONSE 404), (b) the device identifier (e.g., (i) from QUERY RESPONSE 404), and (c) a recommended corrective action ("CA") (e.g., corrective action 360 of FIG. 3). According to an embodiment, a unique corrective action identifier ("CA ID") is generated by the FHM 352, to specifically and uniquely identify the corresponding corrective action (e.g., (c) from SIGNED CORRECTIVE ACTION (CA) PAYLOAD 406), and this CA ID is encoded in the corrective action payload of SIGNED CORRECTIVE ACTION (CA) PAYLOAD 406.

Here, a corrective action corresponds to one or more fundamental repair operations that a DSD 304 can perform (e.g., through in-situ execution of code embodied in device firmware) that are known to the FHM 352 and that are available to the DSDs 304, depicted as repair operations code 309 (FIG. 3). For example, a corrective action may be implemented as a defined modular set of fundamental repair operations within the DSD 304 firmware, from which FHM 352 may compose an appropriate corrective action. Such predefined fundamental repair operations can be implemented as represented by unique corrective action command codes, such as an instruction set that uniquely defines each of the corresponding fundamental repair operations. Furthermore, a corrective action may be implemented as a state machine within the DSD 304 which can execute sequences of corrective actions identified by the FHM 352.

With reference to digitally signing the corrective action payload in the context of the PGP encryption technique (or a "PGP-like" encryption technique), message authentication to authenticate or confirm that a message was actually sent by the entity claiming to be the sender and integrity checking to detect whether a message was altered or corrupted since it was generated, is employed. This authentication and integrity approach is facilitated by use of a digital signature (e.g., via the RSA (Rivest-Shamir-Adleman) or DSA (Digital Signal Algorithm) algorithms) generated from a hash of the message plaintext, via use of the random key (e.g., (ii) from QUERY RESPONSE 404).

At block 510, the FHM application transmits the signed corrective action payload to the data center for application to the particular DSD. For example, FHM 352 transmits SIGNED CORRECTIVE ACTION (CA) PAYLOAD 406 to the data center 302, such as to the DSD 304 directly or to a host 306 for conveying to the particular DSD 304, so that DSD 304 can execute in-situ predefined repair operations code 309 (FIG. 3) which correspond to the recommended corrective action from the FHM 352 for self-repair purposes.

According to an embodiment, this SIGNED CORRECTIVE ACTION (CA) PAYLOAD 406 comprises an encrypted communication, such as according to the OTP encryption technique. Thus, prior to the transmission at block 510, the FHM 352 transforms the corrective action payload to a cleartext form, for example, from a binary form (if applicable) so as not to violate the data center 302 binary data use prohibition, and encrypts the transformed corrective action payload. In the context of FHM 352 transmitting an encrypted SIGNED CORRECTIVE ACTION (CA) PAYLOAD 406 to a host 306 in the data center 302, the host 306 in turn decrypts the signed corrective action payload and verifies the query identifier and the device identifier to ensure that the corresponding query is as identified by the query identifier and is intended for the particular DSD 304 as identified by the device identifier, prior to providing instructions to the particular DSD 304 for execution of the one or more fundamental repair operations (e.g., repair operations code 309) corresponding to the recommended corrective action. This ensures that no corrective action intended for one DSD (e.g., DSD 304-1) is inadvertently applied to some other DSD (e.g., DSD 304-2). Furthermore, in the context of the embodiment in which the SIGNED CORRECTIVE ACTION (CA) PAYLOAD 406 includes the CA ID, the host 306 further verifies the CA ID which (e.g., along with a timestamp) ensures that the particular DSD 304 does not duplicate execution of the recommended corrective action.

In view of the foregoing, described herein are secure, scalable, database-agnostic approaches to accessing data storage device data within a secure data center and approaches to secure communications between a fleet health manager and the DSDs within the data center. Such approaches enable the communication of recommended corrective actions for in-situ repair of a DSD from an external fleet health manager to within the data center, in scenarios in which the fleet health manager is not granted direct access to the DSDs within the data center.

Computing System Overview

One embodiment is related to the use of a computing system for implementing techniques described herein, in the form of a computer appliance. A computer appliance refers to a computing system with software or firmware that is specifically designed to provide a specific computing resource. The hardware and software are provided as an integrated product and may provide a turn-key solution for a particular application. Computer appliances are typically designed to not allow the customers to change the software loaded thereon, and the software may be encrypted for security. Note that another form of appliance, referred to as a virtual appliance, may have similar functionality to a dedicated hardware appliance but is distributed as a software virtual machine image.

Figure 6:
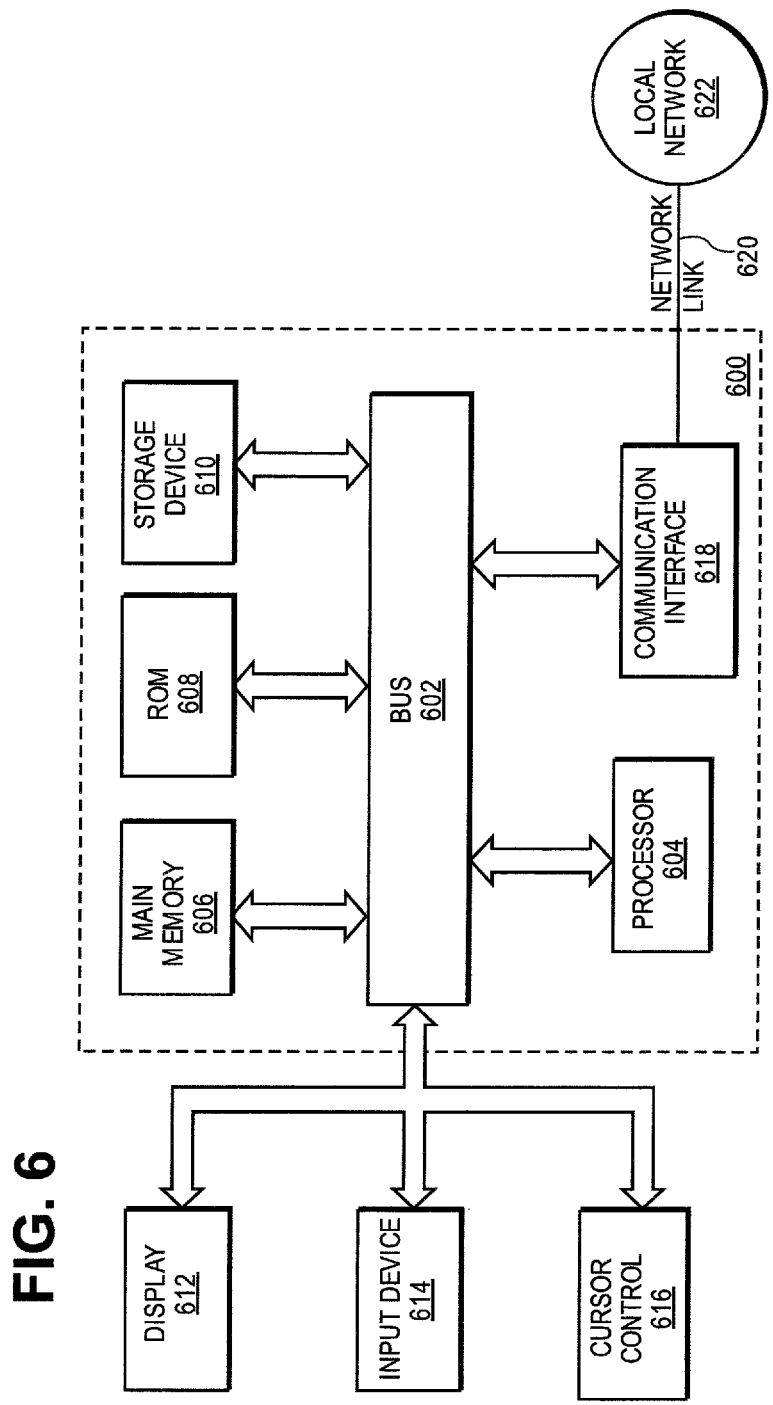
FIG. 6 is a block diagram illustrating a computing system upon which an embodiment may be implemented.

FIG. 6 is a block diagram that illustrates a computing system 600 upon which an embodiment may be implemented. Computing system 600 includes a bus 602 or other communication mechanism for communicating information, and a processor 604 coupled with the bus 602 for processing information. Computing system 600 also includes a main memory 606, such as a random-access memory (RAM) or other dynamic storage device, coupled to bus 602 for storing information and instructions to be executed by processor 604. Main memory 606 also may be used for storing temporary variables or other intermediate information during execution of instructions to be executed by processor 604. Computing system 600 further includes a read only memory (ROM) 608 or other static storage device coupled to bus 602 for storing static information and instructions for processor 604. A storage device 610, such as a hard disk drive (HDD) or a solid-state drive (SSD), is provided and coupled to bus 602 for storing information and instructions.

Computing system 600 may be coupled via bus 602 to a display 612 for displaying information to a user of computing system 600. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612.

According to one embodiment, the techniques described herein may be performed by computing system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry such as firmware or an application-specific integrated circuit (ASIC) may be used in place of or in combination with software instructions to implement embodiments. Thus, embodiments are not limited to any specific combination of hardware circuitry and software.

The terms "computer-readable medium" and "machine-readable medium" if used herein refer to any medium that participates in providing instructions to processor 604 for execution. Such a medium may take many forms, including non-volatile media and volatile media. Non-volatile media includes, for example, HDD(s) and/or SSD(s), such as storage device 610. Volatile media includes dynamic memory, such as main memory 606. Common forms of computer-readable media include, for non-limiting examples, a hard disk, magnetic tape or any other magnetic medium, a CD-ROM or any other optical medium, a RAM, a FLASH-EPROM or any other memory chip or circuitry, or any other medium from which a computer can read. Various forms of computer readable media may be involved in carrying one or more sequences of instructions to processor 604 for execution. For example, the instructions may initially be stored on a memory of a remote computer. The remote computer can load the instructions into its dynamic memory and send the instructions over a network such as network 622. A communication interface 618 of computing system 600 can receive the data from the network link 620 and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

As discussed, computing system 600 also includes the communication interface 618 coupled to bus 602. Communication interface 618 provides a two-way data communication coupling to the network link 620 that is configured to connect to the network 622. For example, communication interface 618 may be a network interface card (NIC) to provide a data communication connection to the connected network 622. Wireless links may also be implemented. In any such implementation, communication interface 618 sends and receives electrical, electromagnetic, or optical signals that carry digital data streams representing various types of information. Network link 620 typically provides data communication through one or more networks to other data devices. Computing system 600 can send messages and receive data, including program code, through the network 622, network link 620 and communication interface 618. The received code may be executed by processor 604 as it is received, and/or stored in storage device 610, or other non-volatile storage for later execution.

Hard Disk Drive Configuration

As discussed, embodiments may be used in the context of a data center in which multiple data storage devices (DSDs) such as hard disk drives (HDDs) are employed. Thus, in accordance with an embodiment, a plan view illustrating an HDD 100 is shown in FIG. 1A to illustrate exemplary operating components.

Figure 1A:
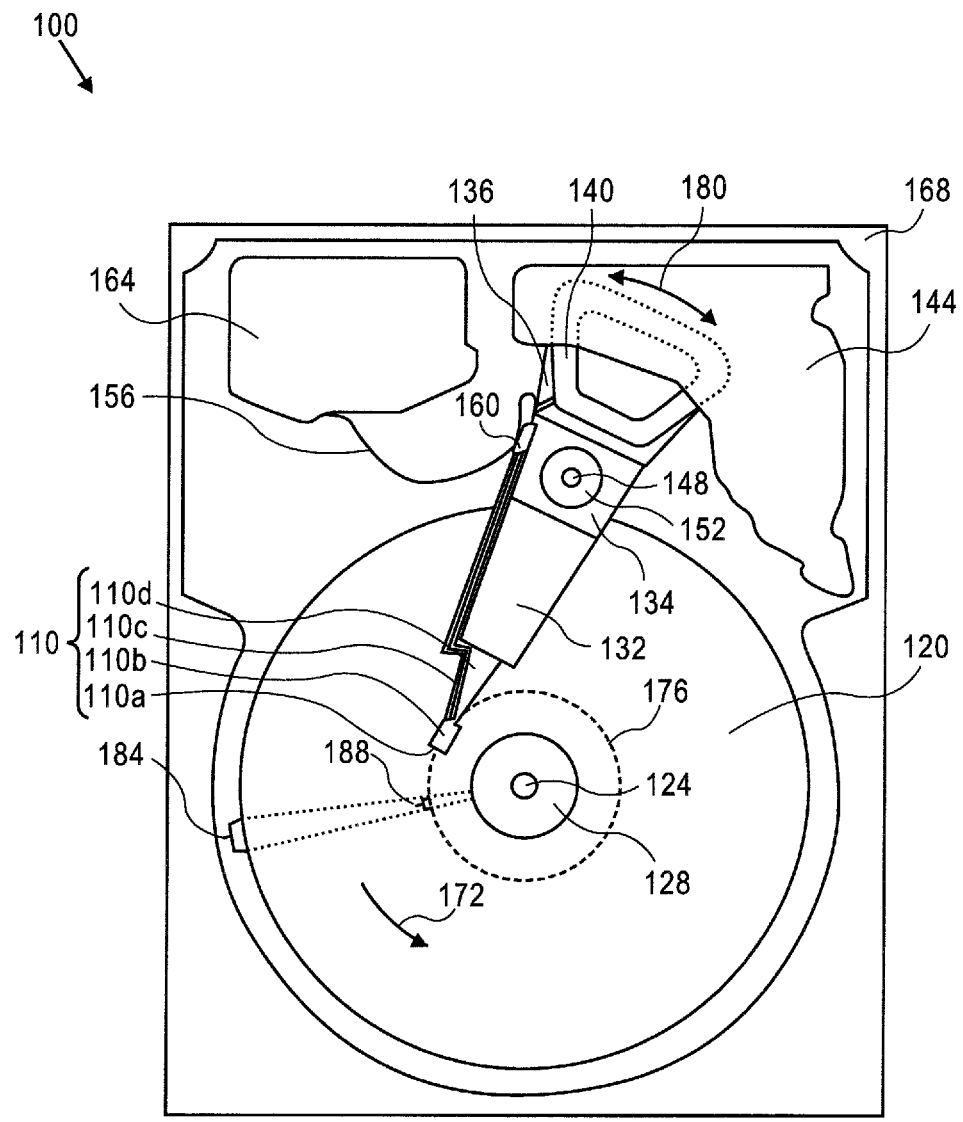
FIG. 1A is a plan view illustrating a hard disk drive (HDD), according to an embodiment.

FIG. 1A illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible)

attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head-stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM) comprising a write signal to and a read signal from the head 110a, are transmitted by a flexible cable assembly (FCA) 156 (or "flex cable"). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium for a non-limiting example, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

Solid State Drive Configuration

Figure 1B:
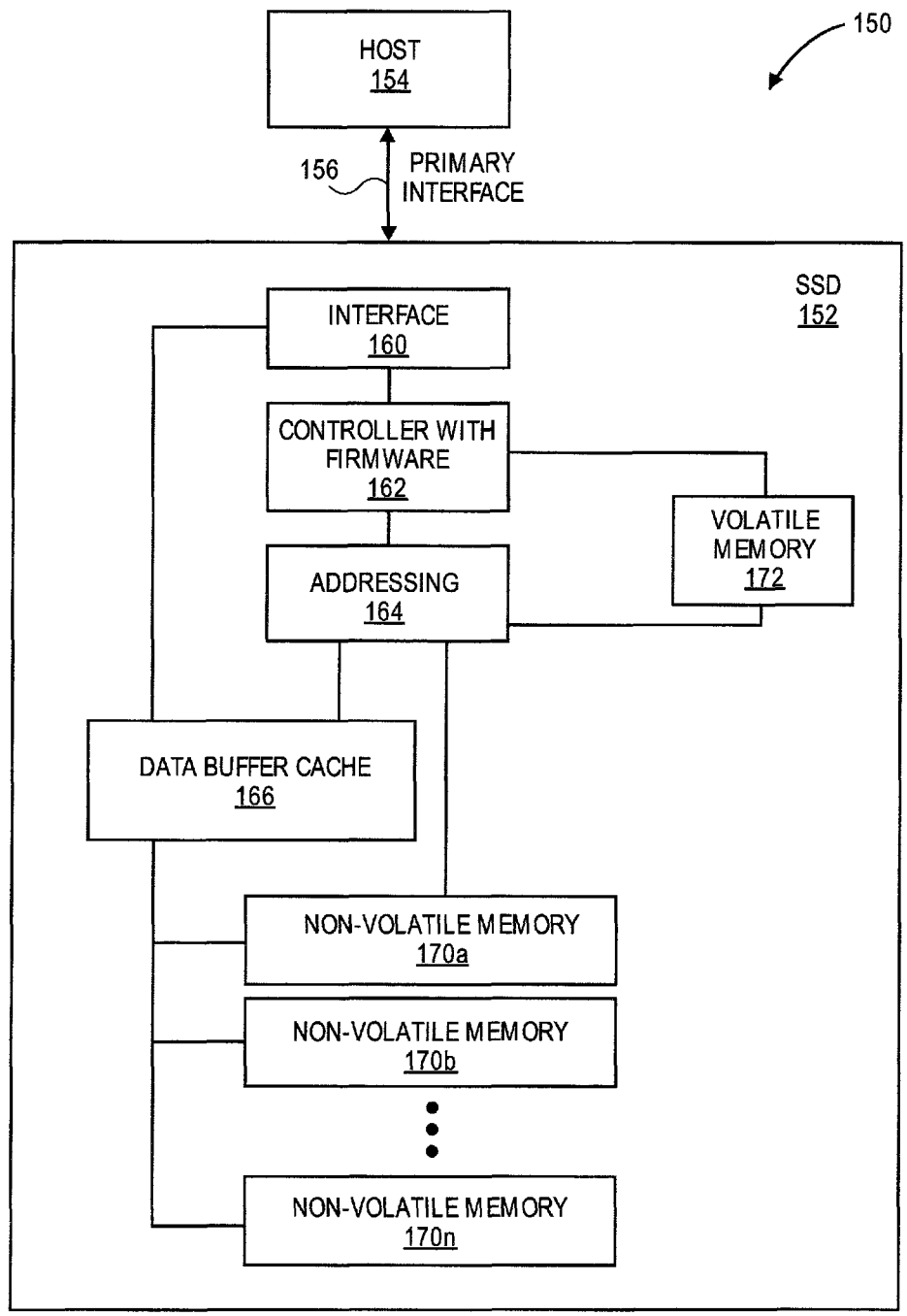
FIG. 1B is a block diagram illustrating a solid-state drive (SSD), according to an embodiment.

As discussed, embodiments may be used in the context of a data center in which multiple data storage devices (DSDs)

such as solid-state drives (SSDs) are employed. Thus, FIG. 1B is a block diagram illustrating an example operating context with which embodiments of the invention may be implemented. FIG. 1B illustrates a generic SSD architecture 150, with an SSD 152 communicatively coupled with a host 154 through a primary communication interface 156. Embodiments are not limited to a configuration as depicted in FIG. 1B, rather, embodiments may be implemented with SSD configurations other than that illustrated in FIG. 1B. For example, embodiments may be implemented to operate in other environments that rely on non-volatile memory storage components for writing and reading of data.

Host 154 broadly represents any type of computing hardware, software, or firmware (or any combination of the foregoing) that makes, among others, data I/O requests or calls to one or more memory device. For example, host 154 may be an operating system executing on a computer, a tablet, a mobile phone, or generally any type of computing device that contains or interacts with memory, such as host 350 (FIG. 3). The primary interface 156 coupling host 154 to SSD 152 may be, for example, a storage system's internal bus or a communication cable or a wireless communication link, or the like.

The example SSD 152 illustrated in FIG. 1B includes an interface 160, a controller 162 (e.g., a controller having firmware logic therein), an addressing 164 function block, data buffer cache 166, and one or more non-volatile memory components 170a, 170b-170n.

Interface 160 is a point of interaction between components, namely SSD 152 and host 154 in this context, and is applicable at the level of both hardware and software. This enables a component to communicate with other components via an input/output (I/O) system and an associated protocol. A hardware interface is typically described by the mechanical, electrical and logical signals at the interface and the protocol for sequencing them. Some non-limiting examples of common and standard interfaces include SCSI (Small Computer System Interface), SAS (Serial Attached SCSI), and SATA (Serial ATA).

An SSD 152 includes a controller 162, which incorporates the electronics that bridge the non-volatile memory components (e.g., NAND (NOT-AND) flash) to the host, such as non-volatile memory 170a, 170b, 170n to host 154. The controller is typically an embedded processor that executes firmware-level code and is an important factor in SSD performance.

Controller 162 interfaces with non-volatile memory 170a, 170b, 170n via an addressing 164 function block. The addressing 164 function operates, for example, to manage mappings between logical block addresses (LBAs) from the host 154 to a corresponding physical block address on the SSD 152, namely, on the non-volatile memory 170a, 170b, 170n of SSD 152. Because the non-volatile memory page and the host sectors are different sizes, an SSD has to build and maintain a data structure that enables it to translate between the host writing data to or reading data from a sector, and the physical non-volatile memory page on which that data is actually placed. This table structure or "mapping" may be built and maintained for a session in the SSD's volatile memory 172, such as DRAM (dynamic random-access memory) or some other local volatile memory component accessible to controller 162 and addressing 164. Alternatively, the table structure may be maintained more persistently across sessions in the SSD's non-volatile memory such as non-volatile memory 170a, 170b-170n.

Addressing 164 interacts with data buffer cache 166, in addition to non-volatile memory 170a, 170b-170n. Data buffer cache 166 of an SSD 152 typically uses DRAM as a cache, similar to the cache in hard disk drives. Data buffer cache 166 serves as a buffer or staging area for the transmission of data to and from the non-volatile memory components, as well as serves as a cache for speeding up future requests for the cached data. Data buffer cache 166 is typically implemented with volatile memory so the data stored therein is not permanently stored in the cache, i.e., the data is not persistent.

Finally, SSD 152 includes one or more non-volatile memory 170a, 170b-170n components. For a non-limiting example, the non-volatile memory components 170a, 170b-170n may be implemented as flash memory (e.g., NAND or NOR flash), or other types of solid-state memory available now or in the future. The non-volatile memory 170a, 170b-170n components are the actual memory electronic components on which data is persistently stored. The non-volatile memory 170a, 170b-170n components of SSD 152 can be considered the analogue to the hard disks in hard-disk drive (HDD) storage devices.

Furthermore, references herein to a data storage device may encompass a multi-medium storage device (or "multi-medium device", which may at times be referred to as a "multi-tier device" or "hybrid drive"). A multi-medium storage device refers generally to a storage device having functionality of both a traditional HDD (see, e.g., HDD 100) combined with an SSD (see, e.g., SSD 150) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A multi-medium storage device may be architected and configured to operate and to utilize the solid-state portion in a number of ways, such as, for non-limiting examples, by using the solid-state memory as cache memory, for storing frequently-accessed data, for storing I/O intensive data, for storing metadata corresponding to payload data (e.g., for assisting with decoding the payload data), and the like. Further, a multi-medium storage device may be architected and configured essentially as two storage devices in a single enclosure, i.e., a traditional HDD and an SSD, with either one or multiple interfaces for host connection.

Extensions and Alternatives

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicant(s) to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method for exchanging information with a data storage device (DSD) in a secure data center, the method comprising:
   a fleet health manager (FHM) application querying one or more DSDs for data to be analyzed, including providing a unique query identifier;
   a particular DSD providing to the FHM application (i) a device identifier identifying itself, (ii) a random key code, (iii) the data to be analyzed, and (iv) the query identifier;
   the FHM application verifying the query identifier;
   responsive to verifying the query identifier, the FHM application digitally signing a corrective action payload, using the random key code from the particular DSD, comprising the query identifier and the device identifier and a recommended corrective action; and
   the FHM application transmitting the signed corrective action payload to the data center for application to the particular DSD.

2. The method of claim 1, wherein the FHM application querying, the particular DSD providing to the FHM application, and the FHM application transmitting the signed corrective action payload are encrypted communications.

3. The method of claim 1, wherein the particular DSD providing to the FHM application comprises providing the data to be analyzed to a host running in a customer application area of the data center, the method further comprising:
   the host:
      transforming the data to be analyzed from its original form from the particular DSD to a key-value pair form stored in a device database within the data center; and
      extracting the transformed data to be analyzed from the device database.

4. The method of claim 1, further comprising:
   prior to transmitting to the data center, the FHM application:
      transforming the corrective action payload to a cleartext form; and
      encrypting the transformed corrective action payload.

5. The method of claim 1, further comprising:
   prior to transmitting to the data center, the FHM application generating a unique corrective action identifier; and
   wherein the corrective action payload further comprises the corrective action identifier.

6. The method of claim 1, wherein the FHM application transmitting the signed corrective action payload to the data center comprises providing an encrypted form of the signed corrective action payload for a host running in a customer application area of the data center, the method further comprising:
   the host:
      decrypting the signed corrective action payload;
      verifying the query identifier and the device identifier from the corrective action payload; and
      providing instructions to the particular DSD for execution of one or more fundamental repair operations corresponding to the corrective action.

7. The method of claim 6, wherein the one or more fundamental repair operations are coded into firmware of the particular DSD.

8. The method of claim 1, wherein the particular DSD providing to the FHM application includes providing access to the data to be analyzed to a host running in a customer application area of the data center for providing to the FHM application, the method further comprising:
   the particular DSD transforming the data to be analyzed from its original form to a key-value pair form stored in a device database within the data center; and
   the host running in the customer application area of the data center extracting the transformed data to be analyzed from the device database.

9. A non-transitory computer-readable medium storing one or more sequences of instructions which, when executed by one or more processors, cause performance of:
   a fleet health manager (FHM) application querying one or more DSDs in a secure data center for data to be analyzed, including providing a unique query identifier;
   a particular DSD providing to the FHM application (i) a device identifier identifying itself, (ii) a random key code, (iii) the data to be analyzed, and (iv) the query identifier;
   the FHM application verifying the query identifier;
   responsive to verifying the query identifier, the FHM application digitally signing a corrective action payload, using the random key code from the particular DSD, comprising the query identifier and the device identifier and a recommended corrective action; and
   the FHM application transmitting the signed corrective action payload to the data center for application to the particular DSD.

10. The computer-readable medium of claim 9, wherein the one or more sequences of instructions, when executed by the one or more processors, cause further performance of:
    prior to the FHM application querying, encrypting a communication containing the query;
    prior to the particular DSD providing to the FHM application, encrypting a communication containing (i)-(iv); and
    prior to the FHM application transmitting the signed corrective action payload, encrypting a communication containing the signed corrective action payload.

11. The computer-readable medium of claim 9, wherein the particular DSD providing to the FHM application comprises providing the data to be analyzed to a host running in a customer application area of the data center, wherein the one or more sequences of instructions, when executed by the one or more processors, cause further performance of:
    the host:
       transforming the data to be analyzed from its original form from the particular DSD to a key-value pair form stored in a device database within the data center; and
       extracting the transformed data to be analyzed from the device database.

12. The computer-readable medium of claim 9, wherein the one or more sequences of instructions, when executed by the one or more processors, cause further performance of:
    prior to transmitting to the data center, the FHM application:
       transforming the corrective action payload to a cleartext form; and
       encrypting the transformed corrective action payload.

13. The computer-readable medium of claim 9, wherein the one or more sequences of instructions, when executed by the one or more processors, cause further performance of:

prior to transmitting to the data center, the FHM application generating a unique corrective action identifier; and wherein the corrective action payload further comprises the corrective action identifier.

14. The computer-readable medium of claim 9, wherein the FHM application transmitting the signed corrective action payload to the data center comprises providing an encrypted form of the signed corrective action payload to a host running in a customer application area of the data center, wherein the one or more sequences of instructions, when executed by the one or more processors, cause further performance of:

the host:
  decrypting the signed corrective action payload;
  verifying the query identifier and the device identifier from the corrective action payload; and
  providing instructions to the particular DSD for execution of one or more fundamental repair operations corresponding to the corrective action.

15. The computer-readable medium of claim 14, wherein the one or more fundamental repair operations comprise one or more sequences of instructions encoded as firmware of the particular DSD.

16. The computer-readable medium of claim 9, wherein the particular DSD providing to the FHM application includes providing access to the data to be analyzed to a host running in a customer application area of the data center for providing to the FHM application, wherein the one or more sequences of instructions, when executed by the one or more processors, cause further performance of:

prior to providing to the FHM application,
  the particular DSD transforming the data to be analyzed from its original form to a key-value pair form stored in a device database within the data center; and
  the host running in the customer application area of the data center extracting the data to be analyzed from the device database.

17. A data storage device (DSD) fleet health management appliance comprising:

means for executing machine-executable instructions;
means for storing one or more sequences of machine-executable instructions which, when executed by the means for executing, cause performance of:

an analytics module of a fleet health manager (FHM) application querying one or more DSDs installed in a data center for data to be analyzed, including providing a unique query identifier;

a particular DSD providing to the analytics module (i) a device identifier identifying itself, (ii) a random key code, (iii) the data to be analyzed, and (iv) the query identifier;

the FHM application verifying the query identifier;

responsive to verifying the query identifier, the FHM application digitally signing a corrective action payload, using the random key code from the particular DSD, comprising the query identifier and the device identifier and a recommended corrective action; and the FHM application transmitting the signed corrective action payload to a host for application to the particular DSD.

18. The appliance of claim 17, wherein the one or more sequences of machine-executable instructions comprise encrypted instructions.

19. The appliance of claim 17, wherein the one or more sequences of machine-executable instructions, when executed by the means for executing, cause further performance of:

prior to providing to the analytics module, the host:
  transforming the data to be analyzed from its original form from the particular DSD to a key-value pair form stored in a device database within the data center; and
  extracting the transformed data to be analyzed from the device database;

prior to transmitting to the data center, the FHM application generating a unique corrective action identifier; and wherein the corrective action payload further comprises the corrective action identifier.

20. The appliance of claim 17, wherein the one or more sequences of machine-executable instructions, when executed by the means for executing, cause further performance of:

the host:
  verifying the query identifier and the device identifier from the corrective action payload; and
  providing instructions to the particular DSD for execution of one or more fundamental repair operations corresponding to the corrective action.

\* \* \* \* \*